US011442618B2

(12) United States Patent
Qian et al.

(10) Patent No.: US 11,442,618 B2
(45) Date of Patent: Sep. 13, 2022

(54) FLEXIBLE MAPPING OF A WRITING ZONE TO A DIGITAL DISPLAY (71) Applicant: Lenovo (Singapore) Pte. Ltd., Singapore (SG)

(72) Inventors: Ming Qian, Cary, NC (US); Song Wang, Cary, NC (US); Jian Li, Chapel Hill, NC (US); Jianbang Zhang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 647 days.

(21) Appl. No.: 14/867,597

(22) Filed: Sep. 28, 2015

(65) Prior Publication Data

US 2017/0090712 A1 Mar. 30, 2017

(51) Int. Cl.
*G06F 3/04883* (2022.01)
*G06F 3/04845* (2022.01)

(52) U.S. Cl.
CPC ...... *G06F 3/04883* (2013.01); *G06F 3/04845* (2013.01); *G06F 2203/04806* (2013.01)

(58) Field of Classification Search
None
See application file for complete search history.

(56) References Cited

U.S. PATENT DOCUMENTS

| 8,847,922 | B1* | 9/2014 | Kurtz | G06F 3/0416 345/175 |
| 2003/0025678 | A1* | 2/2003 | Lee | G06F 3/147 345/173 |
| 2009/0009489 | A1* | 1/2009 | Lee | G06F 3/038 345/179 |
| 2009/0184943 | A1* | 7/2009 | Gross | G06F 3/033 345/175 |
| 2011/0304537 | A1* | 12/2011 | Eruchimovitch | G06F 3/03545 345/158 |
| 2012/0117506 | A1* | 5/2012 | Koch | G06F 3/04886 345/173 |
| 2013/0342480 | A1* | 12/2013 | Moon | G06F 3/041661 345/173 |
| 2014/0019905 | A1 | 1/2014 | Kim et al. | |
| 2015/0212699 | A1 | 7/2015 | Weksler et al. | |

FOREIGN PATENT DOCUMENTS

| CN | 1402116 A | 3/2003 |
| CN | 102339208 A | 2/2012 |
| CN | 102446055 A | 5/2012 |
| CN | 102520849 A | 6/2012 |
| CN | 103262017 A | 8/2013 |
| CN | 103513916 A | 1/2014 |
| CN | 103547983 A | 1/2014 |
| CN | 104007921 A | 8/2014 |
| CN | 104216648 A | 12/2014 |
| CN | 104364750 A | 2/2015 |
| CN | 104471535 A | 3/2015 |

* cited by examiner

*Primary Examiner* — Parul H Gupta
(74) *Attorney, Agent, or Firm* — Ference & Associates LLC (57) ABSTRACT

One embodiment provides a method, including: identifying a defined display region; receiving, on an off screen input device, user input; scaling, using a processor, the user input based on the defined display region; and displaying, on a display device, the scaled user input within the defined display region. Other aspects are described and claimed.

21 Claims, 4 Drawing Sheets

FLEXIBLE MAPPING OF A WRITING ZONE TO A DIGITAL DISPLAY

BACKGROUND

Devices such as desktops, laptops, tablet computing devices, mobile phones or smart phones, e-readers, and the like provide users with convenient functionality. Users may input data such as text, handwriting, or drawing input in a variety of manners, e.g., a soft or on-screen keyboard (OSK), a mechanical or physical keyboard, touch screen, touch pad, writing tablet, digitizer or other writing surface, etc. Certain input methods allow for a more intuitive method of interaction with an application or device.

In some devices (e.g., tablet computing devices) the user relies primarily on a touch screen or touch surface which may be used to provide ink strokes (e.g., handwriting, drawing, etc.). However, some devices may be limited in size (e.g., smartphones and tablets) which also limits the available area for input. Thus, additional input devices may be used to allow for larger input areas. Using a larger input area allows for greater detail to be input. However, displaying these larger area inputs can be difficult on smaller devices, and can require a user to pan around the screen in order to view the full input. Additionally, hand drawn images may be visible at a much smaller scale than original input; thus, even when displayed on a larger display device it may be beneficial to reduce the drawing size.

BRIEF SUMMARY

In summary, one aspect provides a method, comprising: identifying a defined display region; receiving, on an off screen input device, user input; scaling, using a processor, the user input based on the defined display region; and displaying, on a display device, the scaled user input within the defined display region.

Another aspect provides an information handling device, comprising: a display device; a processor operatively coupled to the off screen input device and the display device; and a memory device that stores instructions executable by the processor to: identify a defined display region; receive off screen user input; scale the user input based on the defined display region; and display, on the display device, the scaled user input within the defined display region.

A further aspect provides a product, comprising: a storage device having code stored therewith, the code being executable by a processor and comprising: code that identifies a defined display region; code that receives off screen user input; code that scales the user input based on the defined display region; and code that displays, on a display device, the scaled user input within the defined display region.

An even further aspect provides an information handling device, comprising: an off screen input device, a display device; a processor operatively coupled to the off screen input device and the display device; and a memory device that stores instructions executable by the processor to: identify a defined display region; receive off screen user input; scale the user input based on the defined display region; and display, on the display device, the scaled user input within the defined display region.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Increasingly, handwriting or sketching input has been used as a way to create electronic data (e.g., hand written information, drawings, formulas, etc.). Users are comfortable using their hands to record their thoughts or work out problems; thus, it is normal progression that human handwriting becomes one of the more popular forms of data entry or computer manipulation. However, it can be difficult for electronic touch surfaces to completely replicate the experience of drawing on a paper surface. For example, a user may experience a lack of control or feed back on a touch surface. This can lead to less precise movements, which in turn leads to poor quality.

One solution to this problem is for a user to draw or write larger than they would have otherwise, e.g., if using paper. For example, a user may sketch an electronic circuit in a larger size that could easily be read and understood at a quarter of the size.

An additional difficulty is that current off-screen writing solutions map at a one-to-one scale with the display. Thus, a stroke made on the paper surface is mapped directly to the display screen in both location and size. However, because there could be misalignment (between the display and the off screen writhing input), a cursor may be shown on the display screen to show the mapped position with respect to the current pen position on the paper.

This technical issue presents problems for a user in that, as discussed, the user may desire to write in a larger format than the desired display (e.g., to include proper clarity). Although the desire to reduce or enlarge the received touch input can vary (e.g., save screen space, increase available detail, fill entire display, etc.) the inability to scale the drawings or other inputs results in a similar problem (e.g., poor utilization of screen real estate). Thus, an embodiment is needed that can provide a solution that is more convenient in the scenarios discussed herein. A need exists for an intuitive way to define a flexible writing zone on the digital display screen that can be mapped to a writing zone.

Accordingly, an embodiment provides a method of specifying a region (mapped to the off-screen writing zone) using pen/finger drawing or gesture. This writing zone may be identified via a touch display or off screen touch device. Off screen writing has some benefit as it can take place on a more tactile surface (e.g., paper, textured touch surface, etc.).

Then, only that area (i.e., the specified region) of the display zone receives and displays the input stroke data received at the touch surface (e.g., off-screen writing surface, display touch screen.). An embodiment may then allow the user to reserve a display region to receive the real-time strokes captured. For example, using an ultrasonic touch surface and real paper. The stroke size will be scaled (e.g., down or up) automatically depending on the reserved region size and real paper size. Alternatively, once the off-screen input is complete, an embodiment only selects a sub-portion of the input (e.g., only where stroke data is present) to be mapped to the reserved display region instead of the whole paper area (because most of the existing paper may be blank (i.e., without stroke input)).

The illustrated example embodiments will be best understood by reference to the figures. The following description is intended only by way of example, and simply illustrates certain example embodiments.

Figure 1:
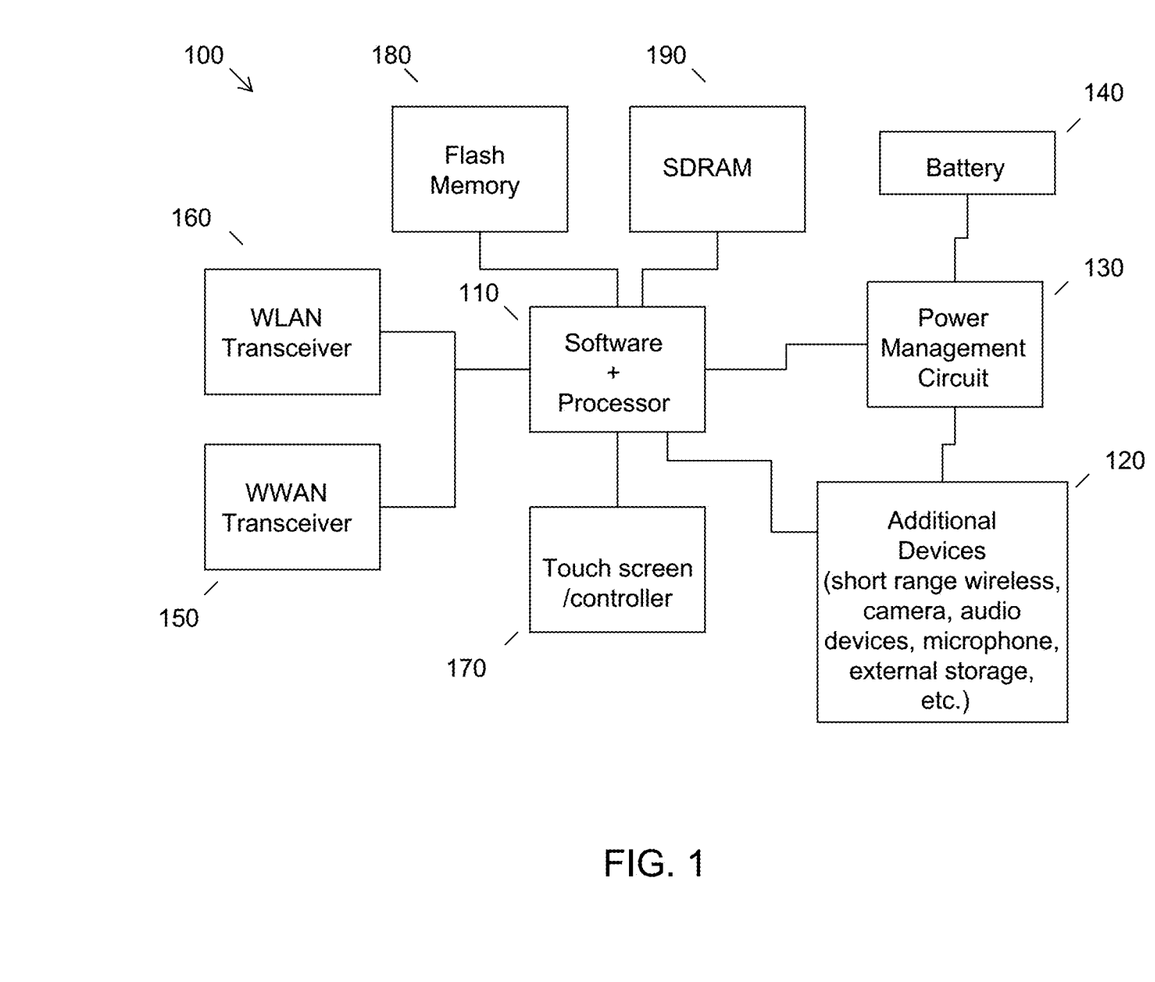
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, an ultra sonic system for accepting off screen writing input (as described herein), etc. System 100 often includes a touch screen 170 for data input and display/rendering. System 100 also typically includes various memory devices, for example flash memory 180 and SDRAM 190.

Figure 2:
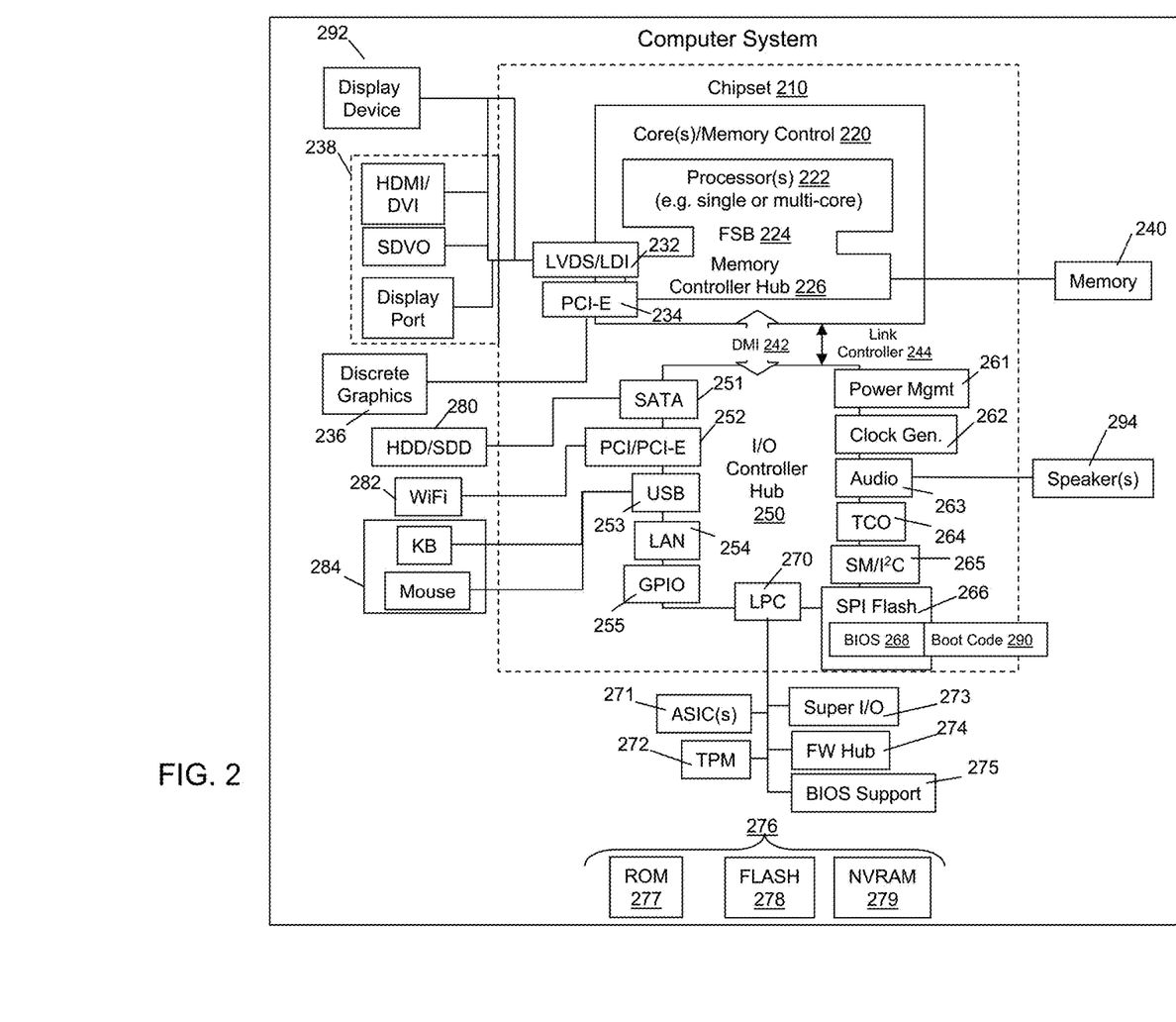
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to input handwriting input (e.g., drawings, figures, text, etc.). For example, the circuitry outlined in FIG. 1 may be implemented in a tablet or smart phone embodiment, whereas the circuitry outlined in FIG. 2 may be implemented in a personal computer embodiment.

Figure 3:
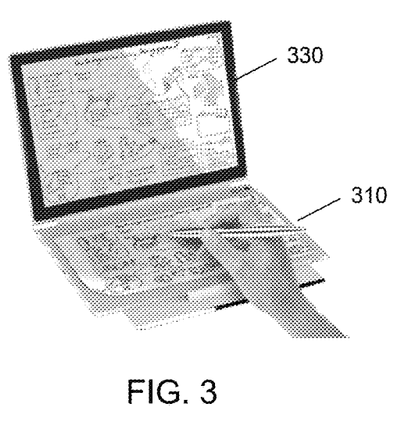
FIG. 3 illustrates an example embodiment of an off screen touch input device and a display device.

Referring now to FIG. 3, an example embodiment of accepting off screen handwriting input is shown. A user may enter handwriting input (e.g., using a stylus, finger, or the like) on an off screen touch surface at 310. In an embodiment, the touch surface 310 may have physical paper overlaid on it (as shown in FIG. 3). The handwriting input (e.g., textual representations, sketches, etc.) may be shown on a display device 330. As discussed herein, current implementations of an off screen solution map the input provided at surface 310 in a one to one format with regard to both location and size for display at display device 330.

Figure 4:
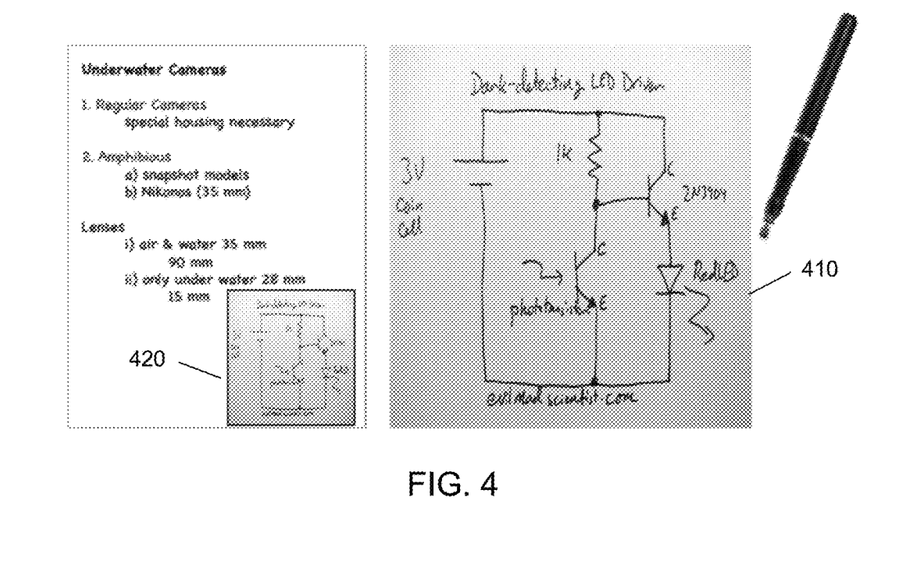
FIG. 4 illustrates an example embodiment of scaling a mapped writing zone to a digital display.

In contrast, an embodiment allows for a user to scale handwriting input at surface 310 up or down depending on the selected display area. Referring briefly to FIG. 4, an example embodiment is shown where a user input comprising an electrical circuit is drawn on the off screen touch surface 410. In the example, a user may wish to display the circuit diagram it in the lower right corner of the display page on a display device, e.g., display device 330. Thus, in order to allow a user sufficient area to include all the details of the circuit, an embodiment may allow the user to draw the circuit utilizing the full area on the off screen touch surface, illustrated at 310 or 410. An embodiment may then, for example, scale the user input (e.g., circuit sketch) into an area of a document designated for display, e.g., as illustrated in lower corner of the display at 420.

Figure 5:
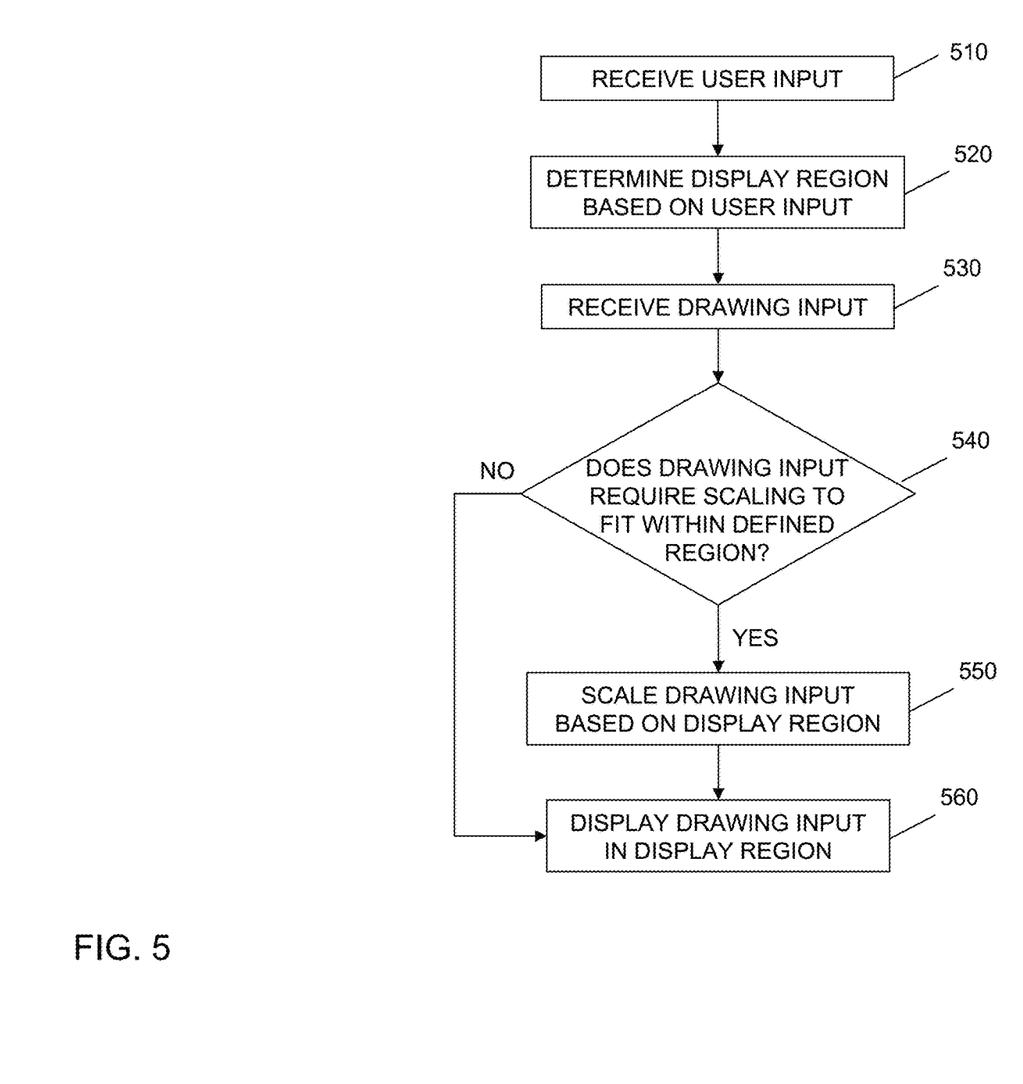
FIG. 5 illustrates an example method of flexible mapping of a writing zone to a digital display.

Referring now to FIG. 5, an example method of flexibly mapping a writing zone to a digital display is illustrated. An embodiment may first receive at 510, at an input device (e.g., a touch screen, off screen touch input device (e.g., digitizer, sonic input device surface, etc.), touch pad, keyboard, mouse, etc.) user input identifying a region of a display (e.g., sub-portion of the display or the display as a whole). For example, a user may select the lower right hand portion of a display screen, such as that indicated at 420. Based on the user input, an embodiment may identify a defined display region (e.g., the lower right hand portion) at 520.

Additionally or alternatively, an embodiment may determine the display region based on a user setting. The user setting may be tied to an application, for example, a user may setup a note taking application to automatically scale drawing input into the bottom right corner of a document. In an embodiment, the setting may be a global setting or a setting across multiple selected applications. Additionally or alternatively, an embodiment may determine the defined display region based on at least one application requirement. For example, a particular communication application (e.g., an email application) may require all hand written notes to be inserted into a specific section (e.g., the bottom of the body section of an email).

Once the defined display region is identified, an embodiment may receive user input (e.g., drawing input, handwriting input, ink stroke input, etc.) on a touch device (e.g., a surface acoustic wave touch device, resistive touch device, capacitive touch device, infrared grid touch device, optical touch device, acoustic pulse device, etc.). Based on the user's drawing input, an embodiment may determine if the drawing input needs to be scaled to fit within the defined region at 540. For example, a user's sketch input (such as that at 420) may be larger than the defined display region (such as that at 410). Alternatively, a user may define a region larger than the input at 530, thus the sketch may be scaled up in order to utilize the entire display region. If it is determined that the drawing input is properly sized to fit within the desired display region or if scaling is not to be implemented, an embodiment may place the drawing input into display area with no scaling.

If an embodiment determines that the drawing input requires scaling to fit within the defined region at 540, it will scale the drawing input based on the display region at 550. An embodiment may scale the drawing input on the fly (i.e., in real time) as the drawing input is received. For example, as the drawing input increases in scale, the entire drawing size is recalculated based on the difference in size between the defined display region and the region used for actual input. Alternatively, an embodiment may wait for the drawing input at 530 to be completely entered before scaling. The conclusion or end of the drawing input may be based on various factors performed by the user (e.g., selecting a finish button, speaking a command phrase, gesture input, etc.) or based on a predetermined action occurring (e.g., a timeout based on last received user input).

In an embodiment, scaling the drawing input may also be based on the drawing input or drawing input device. For example, the scale of the drawing may be determined based on the overall size (i.e., border dimensions) of the touch input device (e.g., an eight (8") by ten (10") tablet device). Alternatively, the scale of the drawing may be based on the size (i.e., dimensions) of the drawing input itself. For example, if a user were to only write ten (10) words, those ten words will populate the defined area (i.e., fill it completely). Alternatively, if a user were to continue writing more words (e.g., one hundred (100) words), those words would be scaled to fit within the defined area (e.g., the text would be reduced in size to accommodate the additional user input. Although the above example was based on textual input, it is considered a non-limiting example, wherein the user input may be any form of input (e.g., drawing, handwriting, etc.)

Finally, an embodiment will display the drawing input in the display region at 560. The drawing input may then become part of the application file it is displayed in (e.g., text document, note taking application, email application, etc.). For example, a user may be creating a slide show presentation, which contains various hand drawn schematics on specific slides. The slide show presentation is then saved and the hand drawn schematics are stored within the slide show as part of the file (e.g., an inserted object).

Accordingly, as illustrated by the example embodiments and figures, an embodiment provides receiving user input that identifies a defined display region. An embodiment then receives, using a touch sensitive surface (e.g., an off screen touch device), hand written ink stroke data. The ink stroke data is then scaled (e.g., smaller or larger, optionally in real time) and displayed within the identified display region.

The various embodiments described herein thus represent a technical improvement to the use of an off screen input device to input hand written user input into a file, document, communication or the like. Thus, an embodiment may receive or automatically determine a defined region representative of a particular area on a display device. The embodiment then receives touch input on the off screen touch device that comprises any form of hand written input. The hand written input is then scaled based on various factors discussed herein. As may be appreciated by those having ordinary skill in the art, certain steps may be reversed in order, combined, or omitted from the non-limiting examples provided herein. By way of example, an embodiment may implement the scaling and/or placement of the user input within the display device after it has been displayed a first time on the display device, an embodiment may identify a defined area for display of the user input automatically (without user selection) or via user selection after the input is first scaled and displayed, etc.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
identifying, from user input, a defined display region for a display device, wherein the defined display region has a defined area size and wherein the defined display region is utilized for displaying user handwriting input provided on an off screen touch input device separate from and operatively coupled to the display device, wherein the identifying comprises receiving a user input identifying a region of the display device to be utilized as the defined display region;
receiving, at the off screen touch input device separate from and operatively coupled to the display device, user handwriting input, wherein the user handwriting input is provided at a first size, the first size being irrespective of the defined area size of the defined display region, wherein an entirety of the user handwriting input is provided to the off screen touch input device;
scaling, using a processor, the user handwriting input, wherein the scaling comprises resizing the user handwriting input to a second size, the second size being based upon and mapped to the defined area size of the defined display region, wherein the scaling occurs during receipt of the user handwriting input, wherein the scaling the user handwriting input comprises dynamically changing a size of the user handwriting input to a size that fits within the defined display region, wherein the dynamically changing the size of the user handwriting comprises dynamically changing, as a scale of the user handwriting input changes, a size of the entirety of the user handwriting input within the defined display region based upon a difference in size between the defined display region and a region of the off screen touch input device that received the user handwriting input;

displaying, on the display device during receipt of the user handwriting input and based upon the at least one user setting, the scaled user handwriting input within the defined display region; and receiving additional handwriting input at the off screen touch input device and accommodating, within the defined display area, the additional handwritten input by rescaling the scaled user handwriting input.

2. The method of claim 1, wherein the user handwriting input is drawing input.

3. The method of claim 1, further comprising receiving user input that identifies the defined display region.

4. The method of claim 1, further comprising receiving user input that identifies a scaling factor.

5. The method of claim 1, wherein the defined display region is automatically identified.

6. The method of claim 1, wherein the defined display region is set by default.

7. The method of claim 1, wherein the defined display region is application specific.

8. The method of claim 1, wherein the off screen touch input device is selected from the group consisting of: a surface acoustic wave device, resistive device, capacitive device, infrared grid device, optical device, induction device, and acoustic pulse device.

9. The method of claim 1, wherein the user handwriting input is scaled based on a size associated with the user handwriting input.

10. The method of claim 1, wherein the scaling is performed as the user handwriting input is received.

11. An information handling device, comprising:
a display device;
a processor operatively coupled to display device; and
a memory device that stores instructions executable by the processor to:
identify, from user input, a defined display region for the display device, wherein the defined display region has a defined area size and wherein the defined display region is utilized for displaying user handwriting input provided on an off screen touch input device separate from and operatively coupled to the display device, wherein to identify comprises to receive a user input identifying a region of the display device to be utilized as the defined display region;
receive, from the off screen touch input device separate from the display device, user handwriting input, wherein the user handwriting input is provided at a first size, the first size being irrespective of the defined area size of the defined display region, wherein an entirety of the user handwriting input is provided to the off screen touch input device operatively coupled to the display device;
scale the user handwriting input, wherein the scaling comprises resizing the user handwriting input to a second size, the second size being based upon and mapped to the defined area size of the defined display region, wherein the scaling occurs during receipt of the user handwriting input, wherein the scaling the user handwriting input comprises dynamically changing a size of the user handwriting input to a size that fits within the defined display region, wherein the dynamically changing the size of the user handwriting comprises dynamically changing, as a scale of the user handwriting input changes, a size of the entirety of the user handwriting input within the defined display region based upon a difference in size between the defined display region and a region of the off screen touch input device that received the user handwriting input;

display, on the display device during receipt of the user handwriting input and based upon the at least one user setting, the scaled user handwriting input within the defined display region; and receive additional handwriting input at the off screen touch input device and accommodating, within the defined display area, the additional handwritten input by rescaling the scaled user handwriting input.

12. The information handling device of claim 11, wherein the user handwriting input is drawing input.

13. The information handling device of claim 11, wherein the instructions are further executed by the processor to receive user input that identifies the defined display region.

14. The information handling device of claim 11, wherein the instructions are further executed by the processor to receive user input that identifies a scaling factor.

15. The information handling device of claim 11, wherein the defined display region is automatically identified.

16. The information handling device of claim 11, wherein the defined display region is set by default.

17. The information handling device of claim 11, wherein the defined display region is application specific.

18. The information handling device of claim 11, wherein the off screen touch input device is selected from the group consisting of: a surface acoustic wave device, resistive device, capacitive device, infrared grid device, optical device, induction device, and acoustic pulse device.

19. The information handling device of claim 11, wherein the user handwriting input is scaled based a size associated with the user handwriting input.

20. A product, comprising:
a non-signal storage device having code stored therewith, the code being executable by a processor and comprising:
code that identifies, based on user input, a defined display region for a display device and wherein the defined display region is utilized for displaying user handwriting input provided on an off screen touch input device separate from and operatively coupled to the display device, wherein the code that identifies comprises code that receives a user input identifying a region of the display device to be utilized as the defined display region;
code that receives user handwriting input provided to the off screen touch input device separate from the display device, wherein the user handwriting input is provided at a first size, the first size being irrespective of the defined area size of the defined display region, wherein an entirety of the user handwriting input is provided to the off screen touch input device operatively coupled to the display device;
code that scales the user handwriting input, wherein the scaling comprises resizing the user handwriting input to a second size, the second size being based upon and mapped to the defined area size of the defined display region, wherein the scaling occurs during receipt of the user handwriting input, wherein the scaling the user handwriting input comprises dynamically changing a size of the user handwriting input to a size that fits within the defined display region, wherein the dynamically changing the size of the user handwriting comprises dynamically changing, as a scale of the user handwriting input changes, a size of the entirety of the user handwriting input within the defined display region based upon a difference in size between the defined display region and a region of the off screen touch input device that received the user handwriting input;

code that displays, on the display device during receipt of the user handwriting input and based upon the at least one user setting, the scaled user handwriting input within the defined display region; and code that receives additional handwriting input at the off screen touch input device and accommodating, within the defined display area, the additional handwritten input by resealing the scaled user handwriting input.

21. An information handling device, comprising:

an off screen touch input device separate from the information handling device, a display device;

a processor operatively coupled to the off screen touch input device and the display device; and a memory device that stores instructions executable by the processor to:

identify, from user input, a defined display region for the display device, wherein the defined display region has a defined area size and wherein the defined display region is utilized for displaying user handwriting input provided on an off screen touch input device separate from and operatively coupled to the display device, wherein the identifying comprises receiving a user input identifying a region of the display device to be utilized as the defined display region;

receive user handwriting input from the off screen touch input device separate from the display device, wherein the user handwriting input is provided at a first size, the first size being irrespective of the defined area size of the defined display region, wherein an entirety of the user handwriting input is provided to the off screen touch input device operatively coupled to the display device;

scale the user handwriting input, wherein the scaling comprises resizing the user handwriting input to a second size, the second size being based upon and mapped to the defined area size of the defined display region, wherein the scaling occurs during receipt of the user handwriting input, wherein the scaling the user handwriting input comprises dynamically changing a size of the user handwriting input to a size that fits within the defined display region, wherein the dynamically changing the size of the user handwriting comprises dynamically changing, as a scale of the user handwriting input changes, a size of the entirety of the user handwriting input within the defined display region based upon a difference in size between the defined display region and a region of the off screen touch input device that received the user handwriting input; and display, on the display device during receipt of the user handwriting input and based upon the at least one user setting, the scaled user handwriting input within the defined display region; and receive additional handwritten input at the off screen touch input device and accommodating, within the defined display area, the additional handwritten input by rescaling the scaled user handwriting input.

* * * * *